(12) United States Patent
Nguyen

(10) Patent No.: US 12,320,399 B2
(45) Date of Patent: Jun. 3, 2025

(54) IMAGE FORMING APPARATUS CAPABLE OF REDUCING BRAKING FORCE APPLIED TO ROTATION OF OPERATION PANEL

(71) Applicant: KYOCERA Document Solutions Inc., Osaka (JP)

(72) Inventor: Giang Thuy Nguyen, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/775,548

(22) Filed: Jul. 17, 2024

(65) Prior Publication Data
US 2025/0027550 A1   Jan. 23, 2025

(30) Foreign Application Priority Data
Jul. 18, 2023 (JP) .................... 2023-116757

(51) Int. Cl.
| | |
|---|---|
| *E05D 11/08* | (2006.01) |
| *B41J 29/00* | (2006.01) |
| *F16D 55/02* | (2006.01) |
| *F16D 65/18* | (2006.01) |
| *G03G 15/00* | (2006.01) |
| *G03G 21/16* | (2006.01) |
| *E05D 11/10* | (2006.01) |
| *F16D 121/14* | (2012.01) |

(Continued)

(52) U.S. Cl.
CPC .............. *F16D 65/18* (2013.01); *B41J 29/00* (2013.01); *F16D 55/02* (2013.01); *G03G 15/5016* (2013.01); *G03G 21/1647* (2013.01); *E05D 11/087* (2013.01); *E05D 11/1078* (2013.01); *F16D 2121/14* (2013.01); *F16D 2127/02* (2013.01); *F16H 19/08* (2013.01)

(58) Field of Classification Search
CPC .... F16H 19/08; E05D 11/087; E05D 11/1078
USPC ......................................... 16/324, 326, 354
See application file for complete search history.

(56) References Cited

U.S. PATENT DOCUMENTS

| | | | | |
|---|---|---|---|---|
| 1,166,702 | A | * | 1/1916 | Mardon .............. E05D 11/1078 16/329 |
| 2005/0078818 | A1 | * | 4/2005 | Bae ..................... H04M 1/0295 379/433.13 |

(Continued)

FOREIGN PATENT DOCUMENTS

JP         2020034011 A        3/2020

*Primary Examiner* — William C Joyce
(74) *Attorney, Agent, or Firm* — Alleman Hall & Tuttle LLP

(57) ABSTRACT

An image forming apparatus includes a brake mechanism which supports an operation panel with respect to an apparatus body such that the operation panel can be stopped at an arbitrary angle. The brake mechanism includes a gear portion, a body-side gear, a button, and a bias member. The gear portion is formed about a rotation shaft in the operation panel. The body-side gear intermeshes with the gear portion and rotates about the rotation shaft. The button is movable in an axial direction of the rotation shaft. The bias member is arranged between the button and the body-side gear and biases the body-side gear along the axial direction. The brake mechanism is capable of reducing a braking force applied to a rotation of the body-side gear by moving the button along the axial direction in a direction in which it moves away from the body-side gear and reducing a bias force.

3 Claims, 11 Drawing Sheets

(51) Int. Cl.
*F16D 127/02* (2012.01)
*F16H 19/08* (2006.01)

(56) References Cited

U.S. PATENT DOCUMENTS

| | | | |
|---|---|---|---|
| 2008/0109994 A1* | 5/2008 | Liao | F16C 11/10 |
| | | | 16/319 |
| 2011/0094058 A1* | 4/2011 | Van Gennep | E05D 11/1007 |
| | | | 16/327 |
| 2017/0275935 A1* | 9/2017 | Shang | F16C 11/045 |
| 2019/0003222 A1* | 1/2019 | Taguchi | G03G 21/1633 |
| 2020/0063790 A1 | 2/2020 | Kawabata et al. | |

* cited by examiner

Rr ←——→ Fr

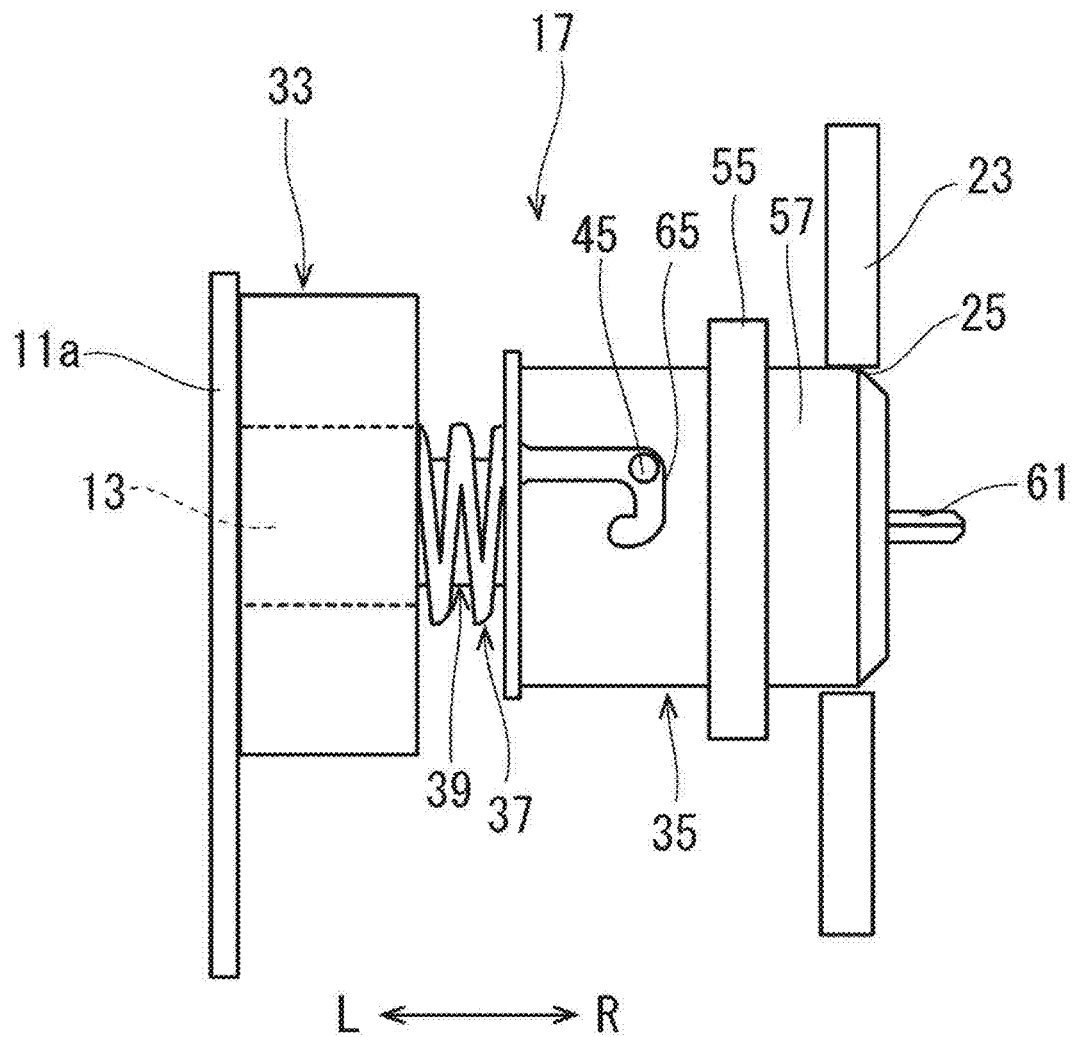

IMAGE FORMING APPARATUS CAPABLE OF REDUCING BRAKING FORCE APPLIED TO ROTATION OF OPERATION PANEL

INCORPORATION BY REFERENCE

This application is based upon and claims the benefit of priority from the corresponding Japanese Patent Application No. 2023-116757 filed on Jul. 18, 2023, the entire contents of which are incorporated herein by reference.

BACKGROUND

The present disclosure relates to an image forming apparatus which includes an operation panel supported by an apparatus body while being capable of stopping at an arbitrary rotation angle.

An apparatus body of an image forming apparatus includes an operation panel to which various operations accompanying image forming operations can be input manually. The operation panel is rotatably supported about a rotation shaft provided in the apparatus body. In addition, by putting a brake on a rotation of the operation panel, the operation panel can be freely stopped at an arbitrary angle with respect to the rotation shaft (the apparatus body).

There is known an image forming apparatus including a screw member provided coaxially with a rotation shaft and a fixing member fixed to an operation panel. A washer is arranged between the screw member and the fixing member. A brake is put on a rotation of the fixing member by a frictional force generated between the screw member and the fixing member, and thus the operation panel can be stopped at an arbitrary angle. There is another configuration including a gear portion provided in an operation panel, a gear which is provided in an apparatus body and intermeshes with the gear portion, and a bias member which biases the gear along an axial direction of a rotation shaft. By biasing the gear by the bias member, a frictional force is generated between the gear and the apparatus body, and this frictional force puts a brake on a rotation of the gear so as to put a brake on a rotation of the gear portion, that is, the operation panel.

SUMMARY

An image forming apparatus according to the present disclosure includes a brake mechanism. The brake mechanism supports an operation panel with respect to an apparatus body such that the operation panel can be stopped at an arbitrary rotation angle. The brake mechanism includes a gear portion, a body-side gear, a button, and a bias member. The gear portion is formed about a rotation shaft in the operation panel. The body-side gear intermeshes with the gear portion and rotates about the rotation shaft. The button is movable in an axial direction of the rotation shaft. The bias member is arranged between the button and the body-side gear and biases the body-side gear along the axial direction. The brake mechanism is capable of reducing a braking force applied to a rotation of the body-side gear by moving the button along the axial direction in a direction in which the button moves away from the body-side gear and thus reducing a bias force of the bias member.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6A is a side view showing the brake mechanism (a state where the button is pushed in) in the image forming apparatus according to the embodiment of the present disclosure;

DETAILED DESCRIPTION

Hereinafter, an image forming apparatus according to an embodiment of the present disclosure will be described with reference to the drawings.

Figure 1:
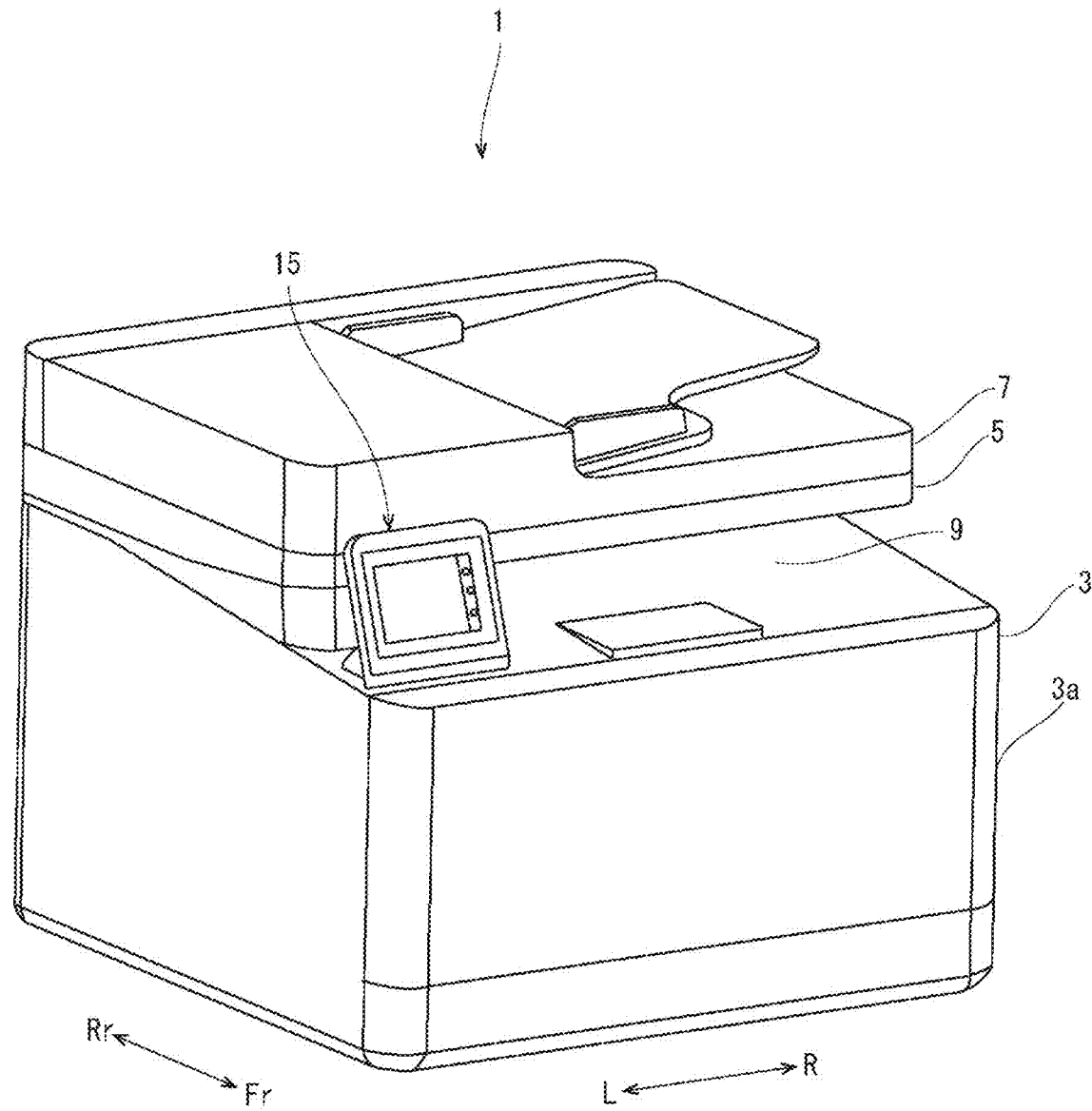
FIG. 1 is a perspective view schematically showing an image forming apparatus according to an embodiment of the present disclosure.

First, an overall configuration of an image forming apparatus 1 will be described with reference to FIG. 1. FIG. 1 is a front view showing the image forming apparatus 1. Fr, Rr, L, and R shown in the respective figures respectively indicate a front side, a rear side, a left side, and a right side of the image forming apparatus 1.

The image forming apparatus 1 includes an image forming unit 3, a document sheet reading unit 5 arranged above the image forming unit 3, and a document sheet conveying unit 7 arranged above the document sheet reading unit 5. An in-body sheet discharge space 9 is formed between the image forming unit 3 and the document sheet reading unit 5. A depth of the image forming unit 3 (a length along a front-rear direction) is longer than that of the document sheet reading unit 5 and the document sheet conveying unit 7.

Figure 2:
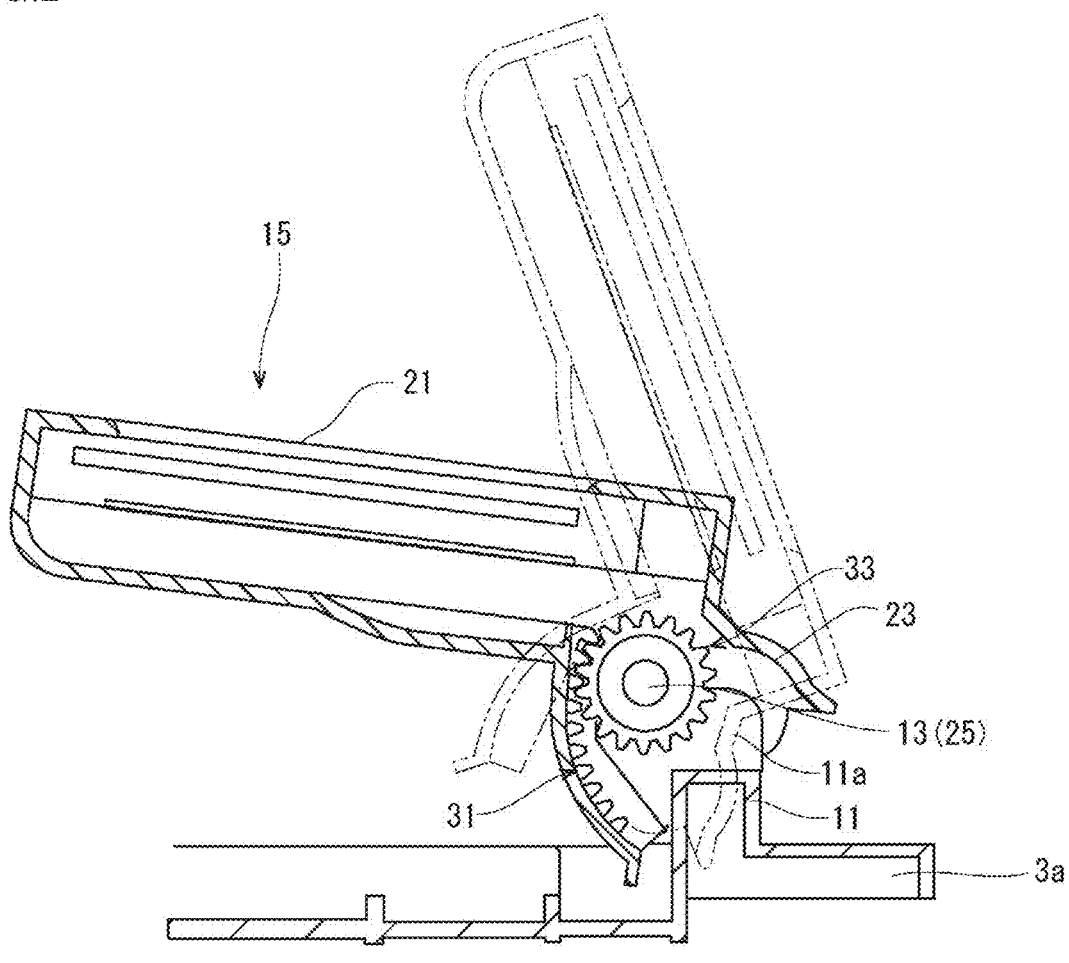
FIG. 2 is a side view showing a gear portion of an operation panel and a body-side gear of an apparatus body in the image forming apparatus according to the embodiment of the present disclosure.

Next, the image forming unit 3 will be described also with reference to FIG. 2. FIG. 2 is a cross-sectional view showing a protrusion portion 11 of an apparatus body 3a and an operation panel 15. On an upper surface of the apparatus body 3a of the image forming unit 3, the protrusion portion 11 is formed more on a front side than the in-body sheet discharge space 9. In this example, as shown in FIG. 1, the protrusion portion 11 is formed at a front left-side corner portion on the upper surface of the apparatus body 3a. As shown in FIG. 2, a support piece 11a protruding upwardly is provided in the protrusion portion 11. On left and right side surfaces of the support piece 11a, left- and right-side rotation shafts 13 are formed to protrude coaxially in directions opposite to each other along a left-right direction. The operation panel 15 is rotatably supported by the left- and right-side rotation shafts 13 via a brake mechanism 17 (an illustration of which is omitted in FIG. 2, and detailed descriptions of which will be given later).

The operation panel 15 will be described with reference to FIG. 2. The operation panel 15 includes a body portion 21 provided with a touch panel, buttons, and the like to which various operations accompanying image forming operations can be input and a leg portion 23 provided at a lower portion of the body portion 21. The leg portion 23 has substantially a hollow semicylindrical shape and includes front and rear side walls and left and right side walls, and a lower surface thereof is opened. On the left and right side walls, shaft holes 25 are opened coaxially along the left-right direction.

Herein, there is known an image forming apparatus including a screw member provided coaxially with the rotation shaft 13 and a fixing member fixed to the operation panel 15. A washer is arranged between the screw member and the fixing member. A brake is put on a rotation of the fixing member by a frictional force generated between the screw member and the fixing member, and thus the operation panel 15 can be stopped at an arbitrary angle. There is another configuration including a gear portion provided in the operation panel 15, a gear which is provided in the apparatus body and intermeshes with the gear portion, and a bias member which biases the gear along an axial direction of the rotation shaft 13. By biasing the gear by the bias member, a frictional force is generated between the gear and the apparatus body, and this frictional force puts a brake on a rotation of the gear so as to put a brake on a rotation of the gear portion, that is, the operation panel 15.

With the configuration described above, however, the frictional force generated by the washer and the bias member, that is, the braking force applied to the rotation of the operation panel 15 is constant. In general, the braking force is set to be high so that the operation panel 15 does not rotate after the operation panel 15 is stopped at an arbitrary angle. In this case, the operation panel 15 needs to be rotated with a strong force for changing the angle of the operation panel 15.

In contrast, in the image forming apparatus 1 according to the embodiment of the present disclosure, it is possible to reduce the braking force applied to the rotation of the operation panel 15 as will be described below.

Figure 3:
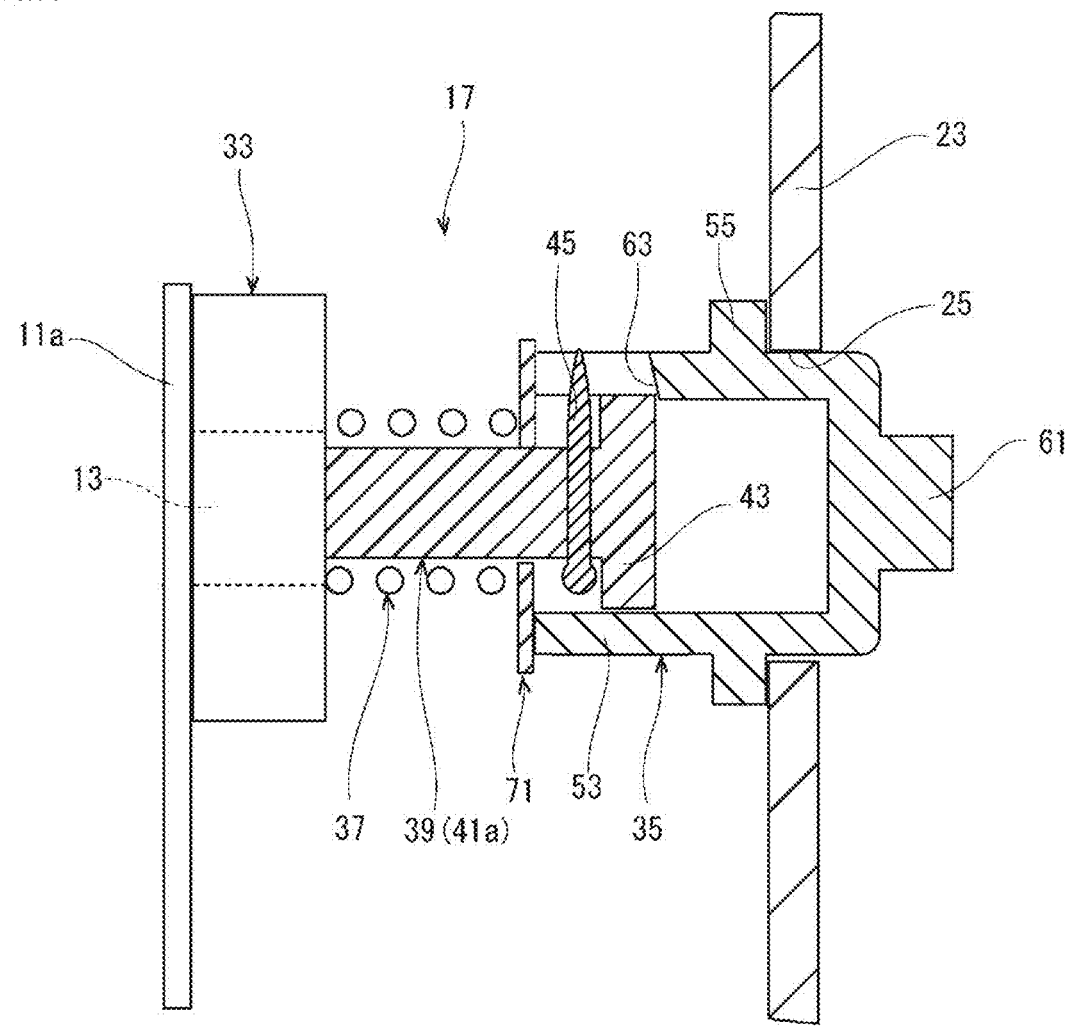
FIG. 3 is a partial cross-sectional view showing a brake mechanism in the image forming apparatus according to the embodiment of the present disclosure.
Figure 4A:
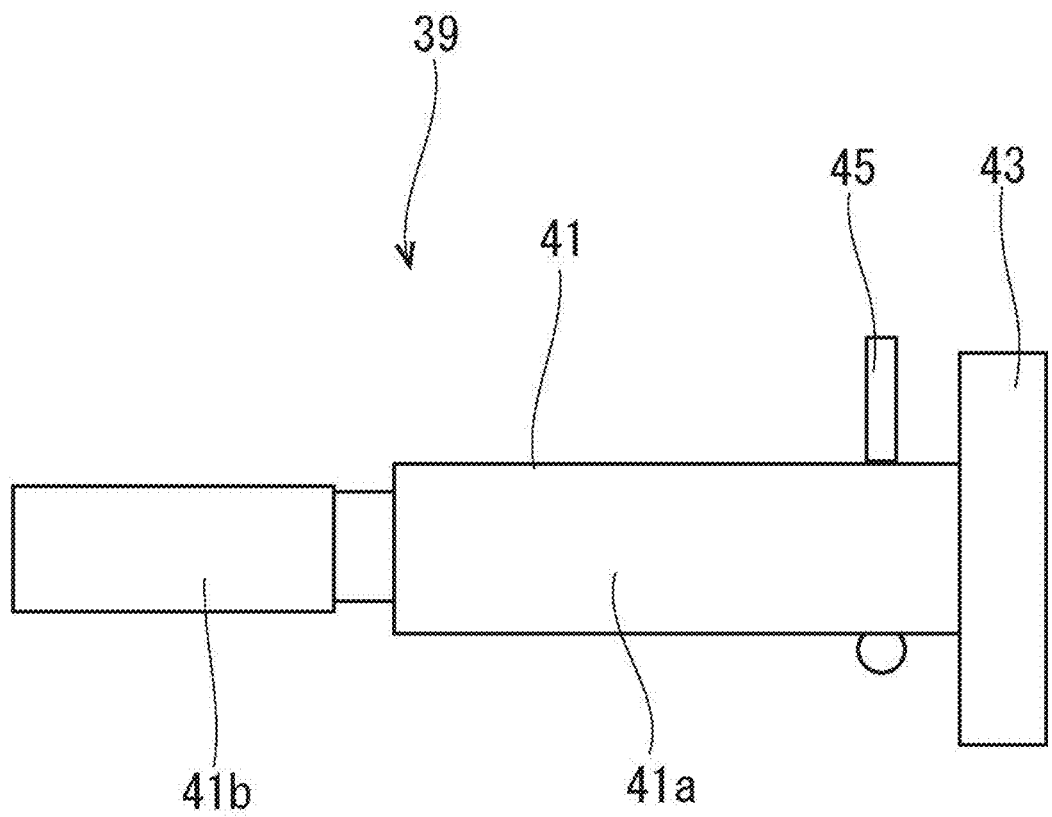
FIG. 4A is a side view showing a fixing member of the brake mechanism in the image forming apparatus according to the embodiment of the present disclosure.
Figure 4B:
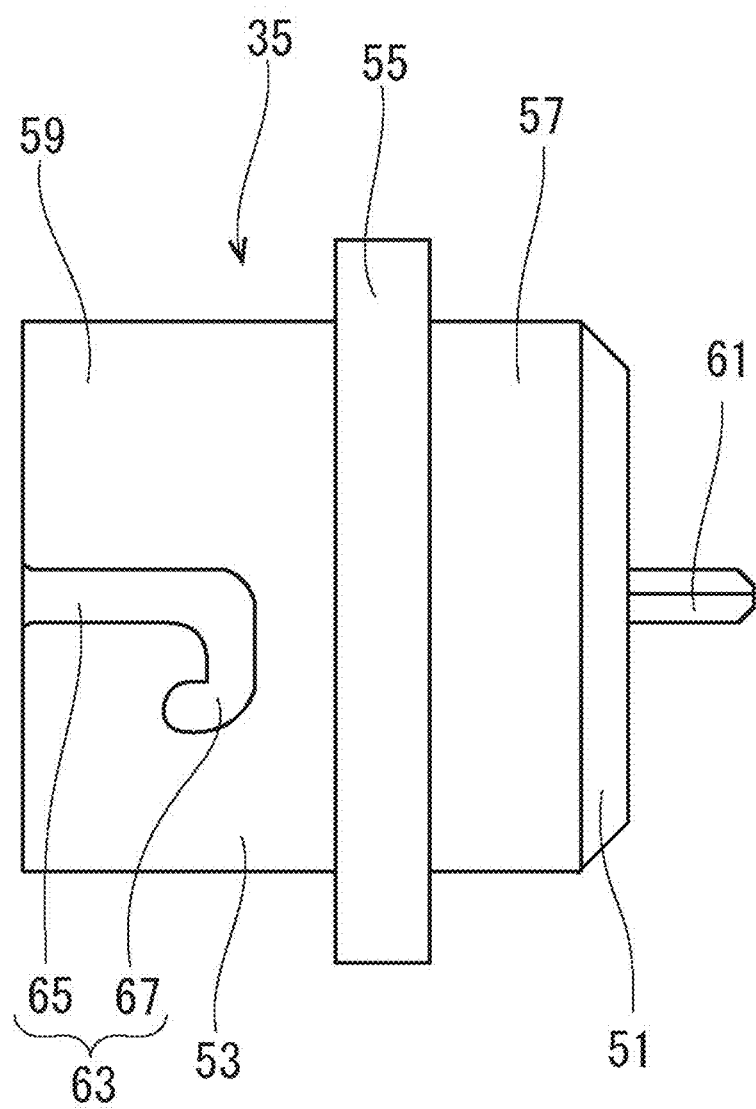
FIG. 4B is a side view showing a button of the brake mechanism in the image forming apparatus according to the embodiment of the present disclosure.

Next, the brake mechanism 17 will be described also with reference to FIG. 3, FIG. 4A, and FIG. 4B. FIG. 3 is a cross-sectional view showing the brake mechanism 17, FIG. 4A is a side view showing a fixing member 39 of the brake mechanism 17, and FIG. 4B is a side view showing a button 35 of the brake mechanism 17.

The brake mechanism 17 supports the operation panel 15 such that the operation panel 15 can be stopped at an arbitrary tilted angle with respect to the upper surface of the apparatus body 3a. A range of the tilted angle is, for example, 3 degrees (see solid lines in FIG. 2) to 70 degrees (see dash-dot-dot lines in FIG. 2). As shown in FIG. 3, the brake mechanism 17 includes an internal gear 31 provided in the operation panel 15, a body-side gear 33 provided in the apparatus body 3a, and a button 35 and a coil spring 37 arranged between the internal gear 31 and the body-side gear 33.

First, the internal gear 31 will be described. As shown in FIG. 2, the internal gear 31 is formed in a fan shape about the shaft hole 25 on an inner surface of the rear-side wall of the leg portion 23 of the operation panel 15.

Next, the body-side gear 33 will be described. The body-side gear 33 is rotatably supported by the right-side rotation shaft 13 formed in the support piece 11a of the protrusion portion 11 of the apparatus body 3a. In addition, the fixing member 39 is provided coaxially with the right-side rotation shaft 13.

The fixing member 39 will be described with reference to FIG. 4A. The fixing member 39 includes a stick-like shaft portion 41 and a disk portion 43 having a larger diameter than the shaft portion 41. The shaft portion 41 includes a large diameter portion 41a and a small diameter portion 41b. The disk portion 43 is fixed to an end surface of the large diameter portion 41a. At an end portion of the large diameter portion 41a on the disk portion 43 side, a through-hole that passes through a center of the large diameter portion 41a is formed along a direction intersecting with an axial direction of the fixing member 39. A fixing pin 45 is inserted into the through-hole. The fixing pin 45 is retained in the through-hole and protrudes from the large diameter portion 41a in the direction intersecting with the axial direction.

As shown in FIG. 3, the shaft portion 41 of the fixing member 39 is fixed coaxially with the right-side rotation shaft 13. As an example, the small diameter portion 41b of the shaft portion 41 is inserted into the right-side rotation shaft 13 and fixed thereto. Thus, the large diameter portion 41a of the shaft portion 41 is arranged coaxially with the right-side rotation shaft 13.

Next, the button 35 will be described with reference to FIG. 4B. The button 35 is a cylindrical member with a bottom surface, that includes a disk portion 51 and a cylindrical portion 53. An inner diameter of the cylindrical portion 53 is slightly larger than an outer diameter of the disk portion 43 of the fixing member 39. At substantially the center of the cylindrical portion 53 in the axial direction, a flange portion 55 that extends toward an outer side of a radial direction along a circumferential direction is formed. A portion closer to the disk portion 51 than the flange portion 55 will be referred to as an operation portion 57, and a portion on the opposite side will be referred to as a body portion 59. A handle 61 is formed on a tip end surface of the operation portion 57 (an outer surface of the disk portion 51). A slit 63 is formed in the body portion 59. The slit 63 includes a guide slit 65 formed along the axial direction of the cylindrical portion 53 from an end edge of the body portion 59 and a restriction slit 67 formed to be folded back in the opposite direction from a tip end of the guide slit 65.

As shown in FIG. 3, the fixing member 39 is fit into the cylindrical portion 53 of the button 35. The fixing pin 45 of the fixing member 39 is inserted into the slit 63 of the button 35. When the fixing pin 45 is inserted into the guide slit 65, the button 35 becomes movable in the axial direction of the rotation shaft 13 along the guide slit 65, and when the fixing pin 45 is inserted into the restriction slit 67, the movement of the button 35 in the axial direction is restricted. In addition, when the fixing pin 45 moves relatively from the guide slit 65 to the restriction slit 67, the cylindrical portion 53 of the button 35 rotates about the fixing member 39 along the disk portion 43 of the fixing member 39.

Next, the coil spring 37 will be described. As shown in FIG. 3, the coil spring 37 is arranged between the button 35 and the body-side gear 33, and the large diameter portion 41a of the shaft portion 41 of the fixing member 39 is fit into the coil spring 37. A washer 71 is arranged between the coil spring 37 and the button 35. The coil spring 37 is compressed between the button 35 (the washer 71) and the body-side gear 33, to thus apply a bias force to the body-side gear 33. Thus, the body-side gear 33 is pressed against the support piece 11a of the protrusion portion 11, and a frictional force is generated between the body-side gear 33 and the support piece 11a. By this frictional force, a brake is put on the rotation of the body-side gear 33. The coil spring 37 is an example of a bias member which biases the body-side gear 33 along the axial direction.

As shown in FIG. 2, the leg portion 23 of the operation panel 15 is covered by the protrusion portion 11 of the image forming unit 3. The left-side rotation shaft 13 formed in the support piece 11a of the protrusion portion 11 is inserted into the shaft hole 25 formed on the left-side side wall of the leg portion 23. In addition, as shown in FIG. 3, the fixing member 39 is fixed to the right-side rotation shaft 13 formed in the support piece 11a of the protrusion portion 11, and the operation portion 57 of the button 35 supported by the fixing member 39 is inserted into the shaft hole 25 formed on the right-side side wall of the leg portion 23. Thus, the operation panel 15 is rotatable about the left- and right-side rotation shafts 13.

Further, as shown in FIG. 2, the internal gear 31 formed on the rear wall of the leg portion 23 of the operation panel 15 intermeshes with the body-side gear 33 rotatably supported by the right-side rotation shaft 13 of the protrusion portion 11. The body-side gear 33 intermeshing with the internal gear 31 rotates about the rotation shaft 13 along with the rotation of the operation panel 15.

Furthermore, as shown in FIG. 3, the fixing pin 45 of the fixing member 39 fixed to the right-side rotation shaft 13 is positioned more on an inner side (the side of the body-side gear 33) than the shaft hole 25 formed on the right-side side wall of the leg portion 23. In other words, a predetermined interval is provided between the fixing pin 45 and the shaft hole 25.

As described above, the button 35 is movable along the axial direction. By moving the button 35 in a direction in which the button 35 approaches the body-side gear 33 (the left-hand direction in FIG. 3), the coil spring 37 is compressed, and the bias force increases. As a result, the frictional force generated between the body-side gear 33 and the support piece 11a increases, and the braking force applied to the rotation of the body-side gear 33 becomes larger. On the other hand, by moving the button 35 in a direction in which the button 35 moves away from the body-side gear 33 (the right-hand direction in FIG. 3), the coil spring 37 is extended, and the bias force decreases. As a result, the frictional force generated between the body-side gear 33 and the support piece 11a decreases, and the braking force applied to the rotation of the body-side gear 33 becomes smaller. It is noted that during such a movement of the button 35 along the axial direction, the operation portion 57 of the button 35 is constantly inserted into the shaft hole 25. Moreover, the button 35 is movable in the direction in which the button 35 moves away from the body-side gear 33 until the flange portion 55 is latched by a periphery of the shaft hole 25.

Figure 5A:
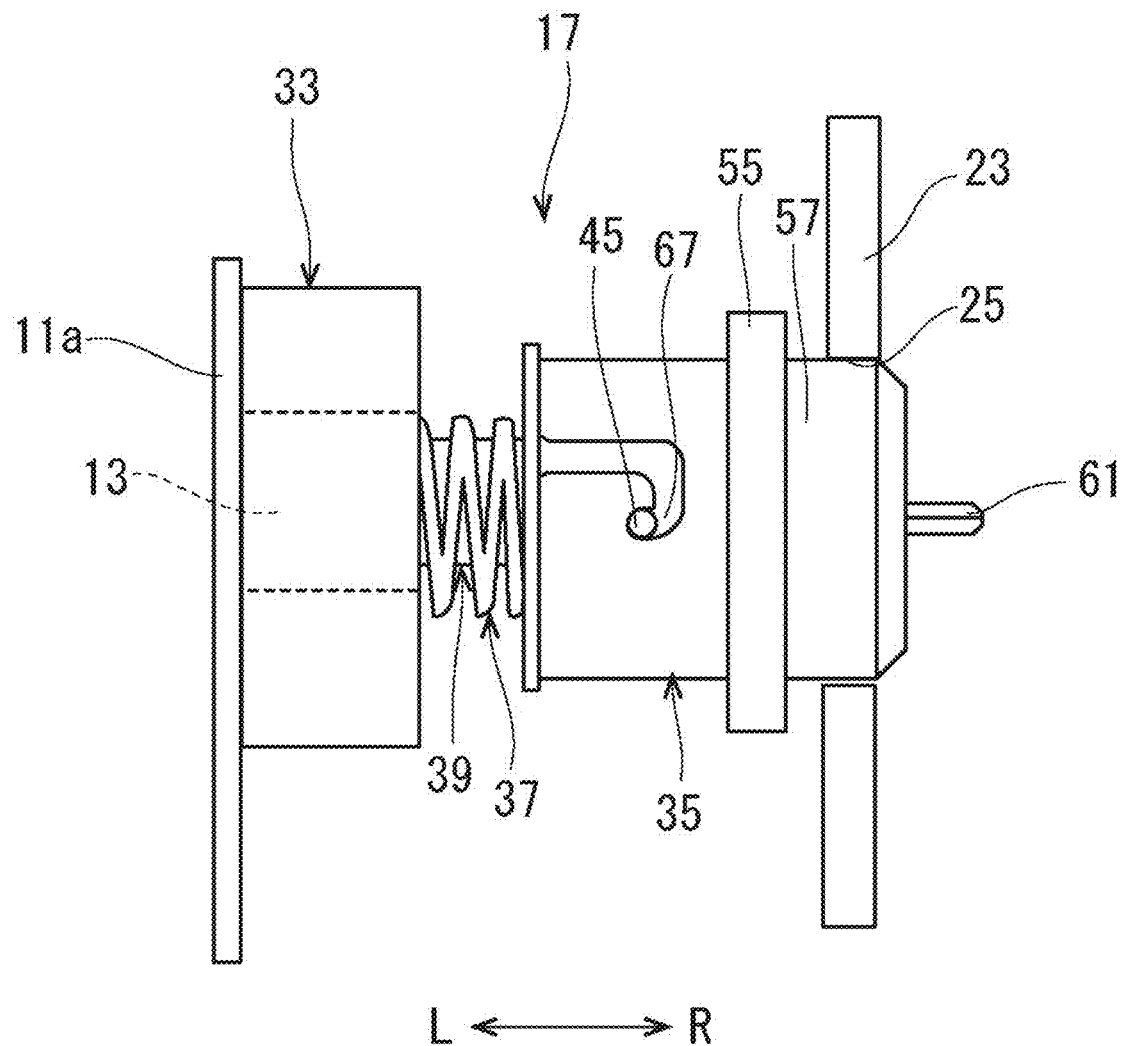
FIG. 5A is a side view showing the brake mechanism (an initial state) in the image forming apparatus according to the embodiment of the present disclosure.
Figure 6B:
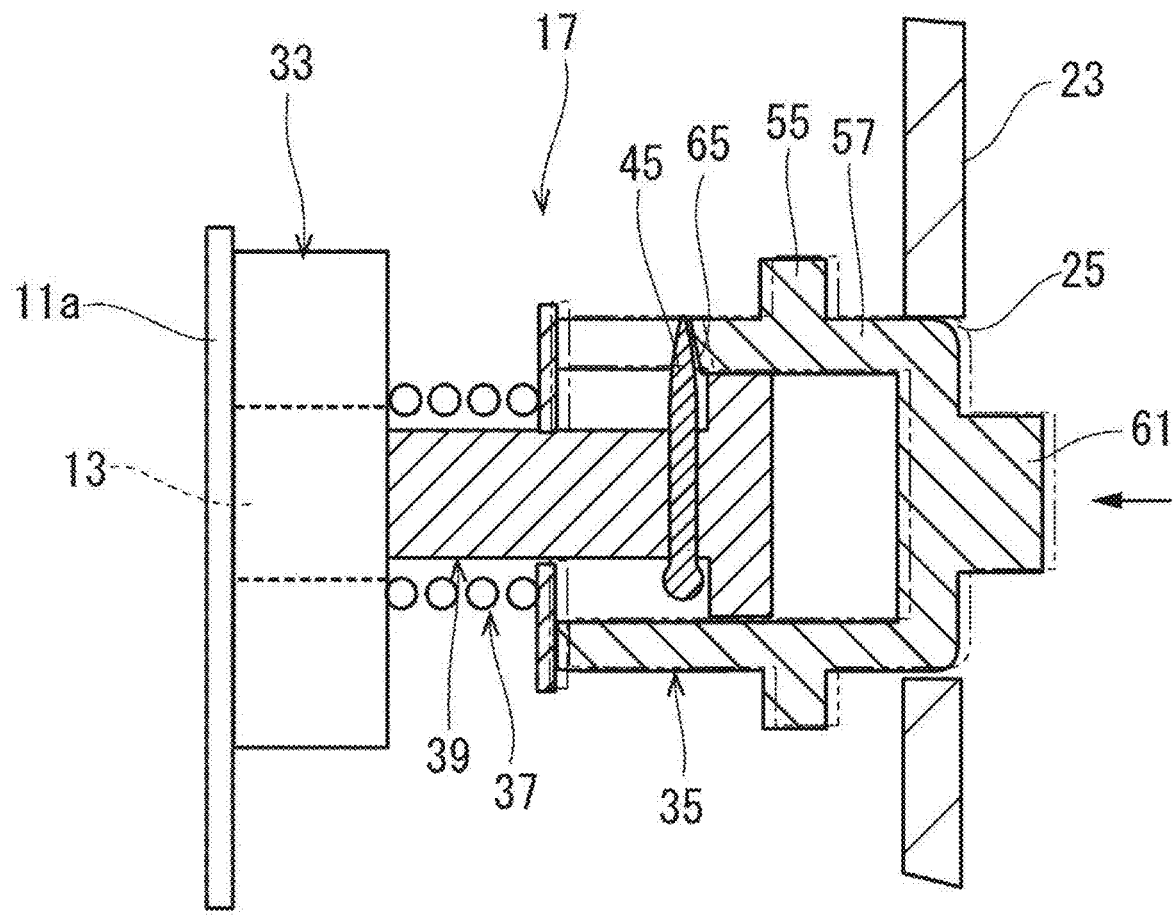
FIG. 6B is a cross-sectional view showing the brake mechanism (the state where the button is pushed in) in the image forming apparatus according to the embodiment of the present disclosure.
Figure 7A:
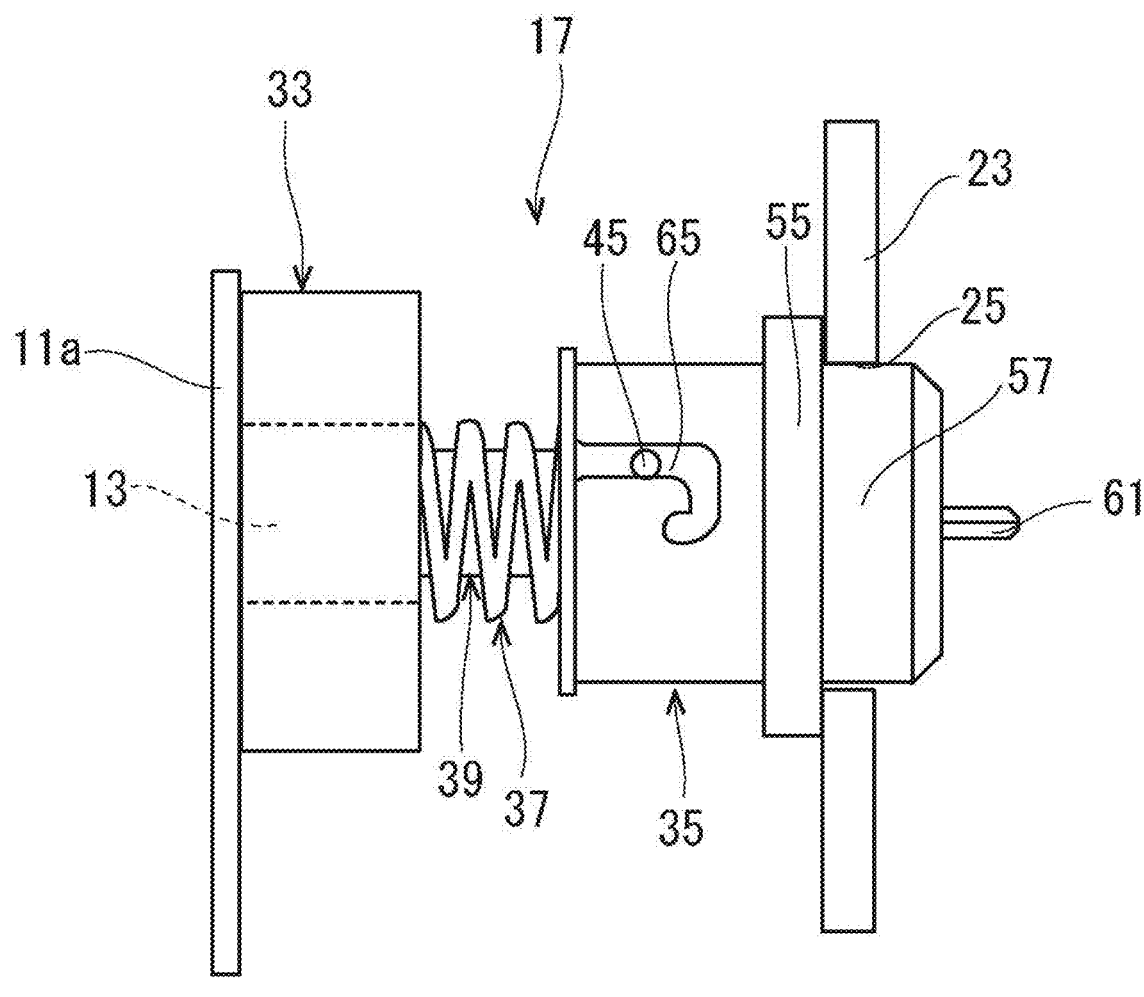
FIG. 7A is a side view showing the brake mechanism (at a time a braking force is reduced) in the image forming apparatus according to the embodiment of the present disclosure.

Rotation operations of the operation panel 15 via the brake mechanism 17 having the configuration described above will be described with reference to FIG. 5A to FIG. 7B. FIG. 5A, FIG. 6A, and FIG. 7A are each a side view showing the brake mechanism 17, and FIG. 5B, FIG. 6B, and FIG. 7B are each a cross-sectional view showing the brake mechanism 17.

Figure 5B:
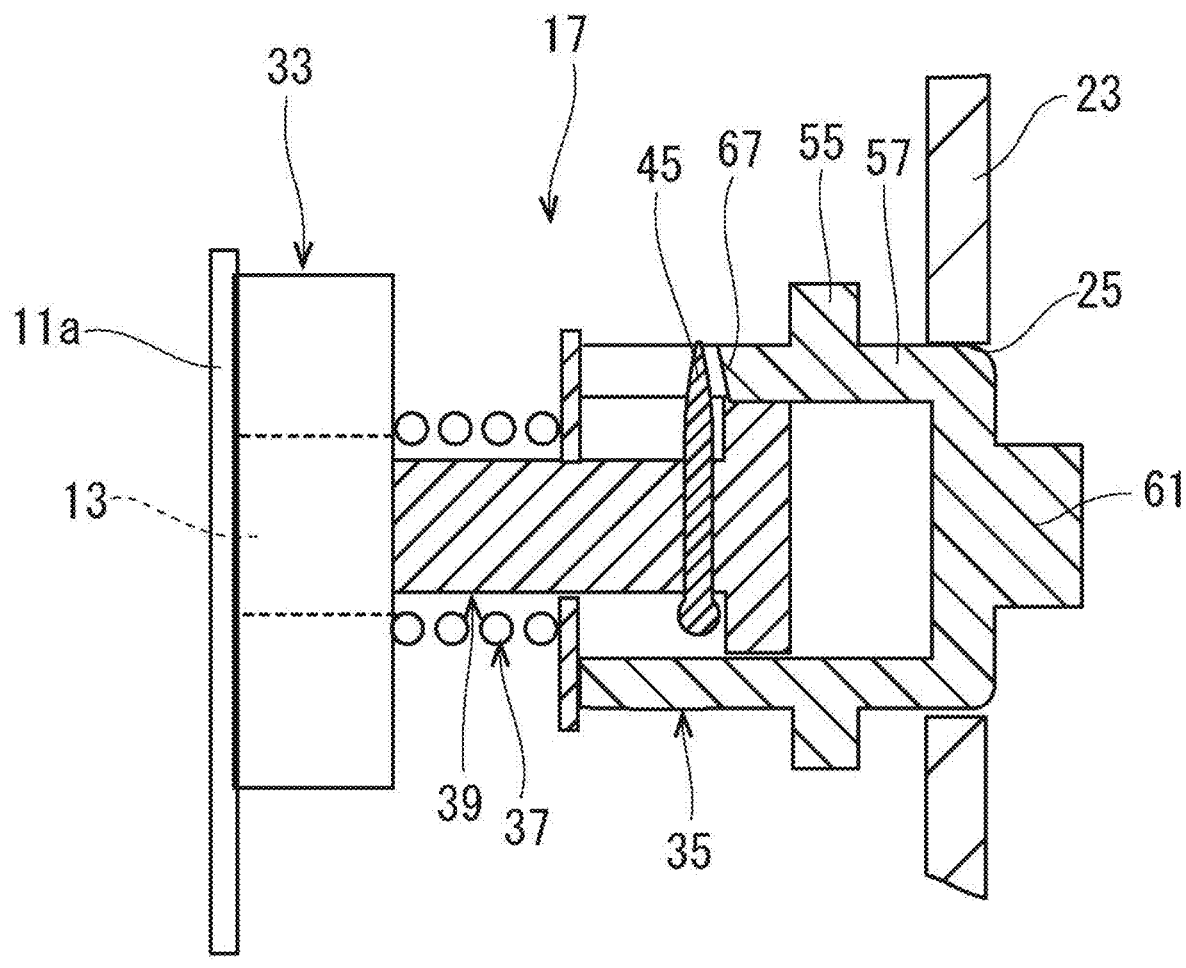
FIG. 5B is a cross-sectional view showing the brake mechanism (the initial state) in the image forming apparatus according to the embodiment of the present disclosure.

As shown in FIG. 5A and FIG. 5B, in an initial state, the fixing pin 45 of the fixing member 39 is inserted into the restriction slit 67 of the button 35. Thus, the button 35 is supported by the fixing member 39 while being unable to move in a state where the operation portion 57 is inserted into the shaft hole 25. A predetermined interval is provided between the flange portion 55 and the shaft hole 25. The coil spring 37 is compressed between the washer 71 and the body-side gear 33, to thus apply a bias force to the body-side gear 33. As an example, a relatively large force of 6.5 N is applied to the body-side gear 33, and a brake is put on the rotation of the body-side gear 33 by the frictional force generated between the body-side gear 33 and the support piece 11a. A force exceeding this braking force needs to be applied to rotate the operation panel 15.

When wishing to rotate the operation panel 15 with a small force, the handle 61 of the operation portion 57 exposed from the shaft hole 25 is held and rotated in a predetermined direction (a counterclockwise direction in this example). As a result, as shown in FIG. 6A and FIG. 6B, the fixing pin 45 moves relatively from the restriction slit 67 to the guide slit 65. It is noted that since the button 35 is somewhat pushed in (see the arrow in FIG. 6B), the coil spring 37 is somewhat compressed. It is noted that the operation portion 57 is still inserted into the shaft hole 25.

Figure 7B:
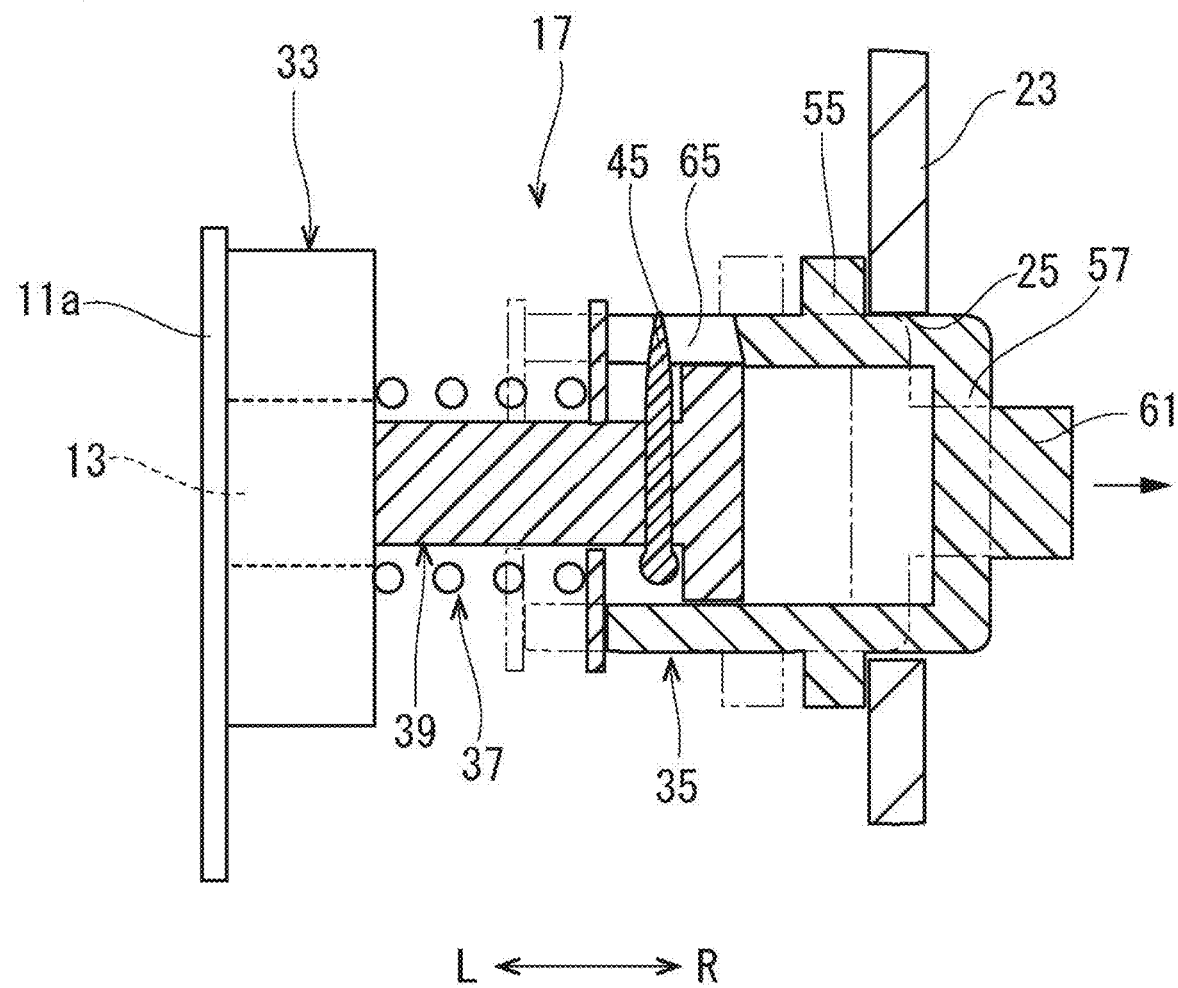
FIG. 7B is a cross-sectional view showing the brake mechanism (at the time the braking force is reduced) in the image forming apparatus according to the embodiment of the present disclosure.

By such a relative movement of the fixing pin 45 from the restriction slit 67 to the guide slit 65, the button 35 is biased by the coil spring 37 via the washer 71 to move in the direction in which the button 35 moves away from the body-side gear 33 (see the arrow in FIG. 7B) as shown in FIG. 7A and FIG. 7B. The button 35 moves until the flange portion 55 is abutted against the periphery of the shaft hole 25. In addition, the fixing pin 45 moves relatively until it reaches the middle of the guide slit 65.

By such a movement of the button 35, the interval between the washer 71 and the body-side gear 33 becomes long, and the coil spring 37 is extended. As a result, the bias force applied from the coil spring 37 to the body-side gear 33 is reduced. Thus, since the frictional force generated between the body-side gear 33 and the support piece 11a decreases, the braking force applied to the rotation of the body-side gear 33 is reduced (5 N as an example), and the operation panel 15 can be rotated with a relatively small force. It is noted that this force is set to a value with which the operation panel 15 can be stopped at an arbitrary angle. Therefore, when the operation panel 15 is rotated to a desired tilted angle against the frictional force, the operation panel 15 stops at that angle.

When setting back to the initial state (a state where the braking force applied to the rotation of the body-side gear 33 is large), the operation portion 57 is pushed in. Consequently, the button 35 is guided by the fixing pin 45 to move along the axial direction, and the fixing pin 45 eventually comes into contact with the end edge of the guide slit 65. After that, by rotating the operation portion 57, the fixing pin 45 enters the restriction slit 67 from the guide slit 65 to thus return to the initial state.

As described above, according to the present disclosure, the braking force applied to the rotation of the body-side gear 33 can be weakened by a simple operation of merely pushing in the operation portion 57 of the button 35 and rotating it. As a result, the operation panel 15 can be rotated with a relatively small force, and further, the operation panel 15 can be stopped at an arbitrary angle.

Specifically, the position of the button 35 can be changed along the axial direction by the periphery of the shaft hole 25 and the fixing pin 45 set apart from each other in the axial direction. In other words, the interval between the button 35 and the body-side gear 33 can be changed. Thus, the bias force to be applied to the body-side gear 33 changes by the compression or extension of the coil spring 37 arranged between the button 35 and the body-side gear 33. As a result, since the frictional force generated between the body-side gear 33 and the support piece 11a changes, the braking force applied to the rotation of the body-side gear 33 can be adjusted.

Further, since the position of the coil spring 37 does not vary or rotate even when the operation panel 15 is rotated, the bias force to be applied to the body-side gear 33 is stabilized. The frictional force generated between the body-side gear 33 and the support piece 11a is stabilized, and thus the operation panel 15 can be stopped for sure.

The descriptions on the present disclosure have been given on the specific embodiment, but the present disclosure is not limited to the embodiment described above. The embodiment described above may be variously changed, substituted, or modified without departing from the scope and gist of the present disclosure, and the scope of claims include all embodiments that may be included in the range of the technical idea.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising a brake mechanism which supports an operation panel with respect to an apparatus body such that the operation panel can be stopped at an arbitrary rotation angle, wherein
the brake mechanism includes
a gear portion formed about a rotation shaft in the operation panel,
a body-side gear which intermeshes with the gear portion and rotates about the rotation shaft,
a button which is movable in an axial direction of the rotation shaft, and
a bias member which is arranged between the button and the body-side gear and biases the body-side gear along the axial direction, and
the brake mechanism is capable of reducing a braking force applied to a rotation of the body-side gear by moving the button along the axial direction in a direction in which the button moves away from the body-side gear and thus reducing a bias force of the bias member.

2. The image forming apparatus according to claim 1, wherein
the button includes
a flange portion extending toward an outer side of a radial direction along a circumferential direction,
a body portion on a side closer to the body-side gear than the flange portion,
an operation portion on a side farther away from the body-side gear than the flange portion, and
a guide slit formed along the axial direction in the body portion and a restriction slit formed to be folded back in an opposite direction from an end edge of the guide slit on a side of the body-side gear,
the apparatus body includes
a shaft hole into which the operation portion is inserted, and
a fixing pin which is arranged at a position closer to the body-side gear than the shaft hole and is inserted into the guide slit and the restriction slit,
the bias force of the bias member generated by the button is increased by inserting the fixing pin into the restriction slit, and
when the fixing pin is inserted into the guide slit, the button is biased by the bias member so as to move in the direction in which the button moves away from the body-side gear until the flange portion is abutted against a periphery of the shaft hole, and thus the bias force of the bias member is reduced.

3. The image forming apparatus according to claim 2, wherein
by rotating the operation portion, the fixing pin shifts from the restriction slit to the guide slit, and the button moves in the direction in which the button moves away from the body-side gear.

* * * * *